L. R. WRIGHT.
CULTIVATOR AND PLOW COMBINED.
No. 6,836. Reissued Jan. 4, 1876.
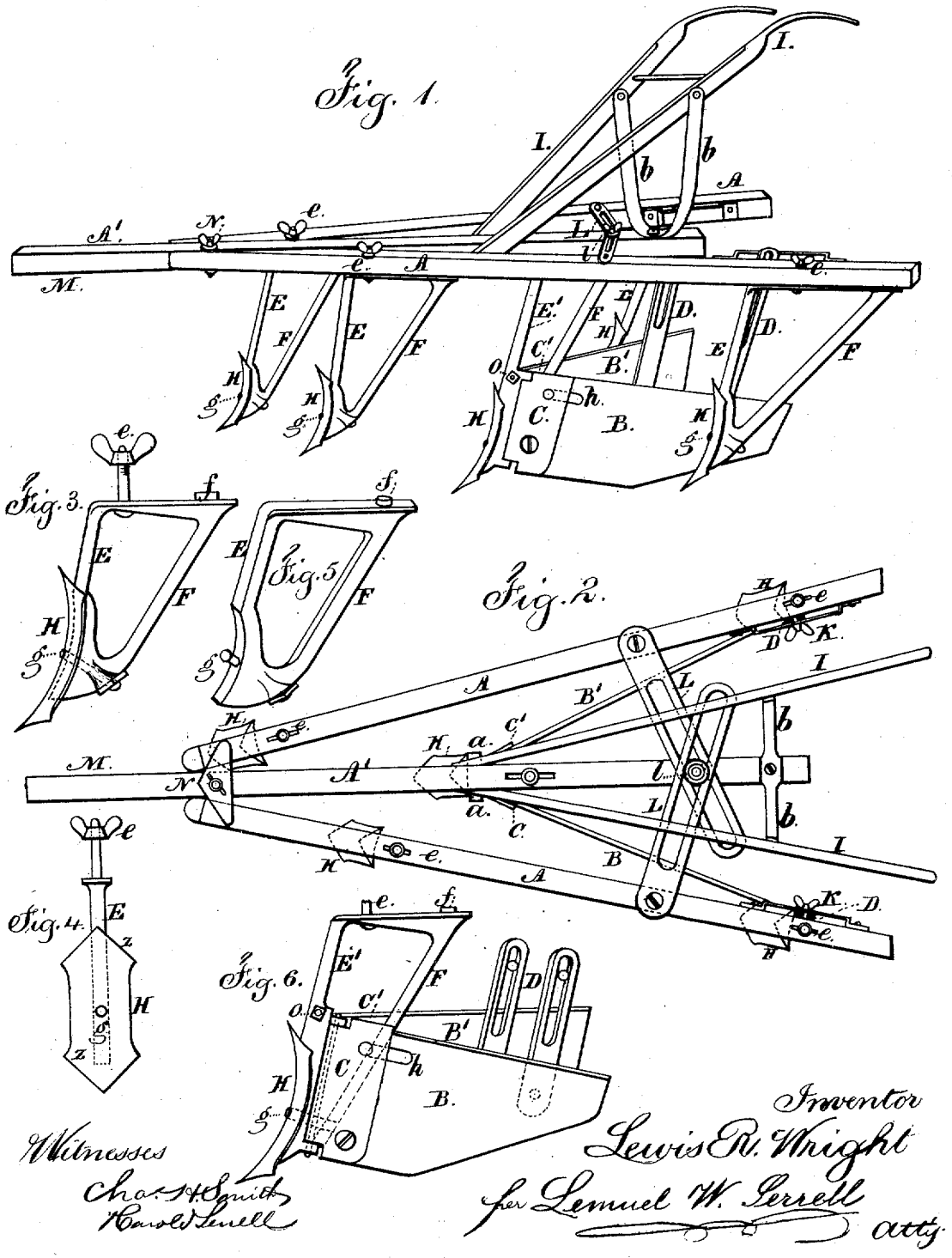
N. PETERS, PHOTO-LITHOGRAPHER, WASHINGTON, D. C.

UNITED STATES PATENT OFFICE.

LEWIS R. WRIGHT, OF HUDSON, NEW YORK, ASSIGNOR, BY MESNE ASSIGNMENTS, TO GIFFORD, JOHNSON & CO.

IMPROVEMENT IN CULTIVATORS AND PLOWS COMBINED.

Specification forming part of Letters Patent No. 81,054, dated August 11, 1868; reissue No. 5,532, dated August 12, 1873; reissue No. 6,836, dated January 4, 1876; application filed November 9, 1875.

*To all whom it may concern:*

Be it known that I, LEWIS R. WRIGHT, formerly of Schenectady, New York, now of Hudson, in the State of New York, have invented certain Improvements in Cultivators and Plows Combined, of which the following is a specification:

Cultivators have been made with teeth having points at both ends, so as to be capable of being reversed; but they have been in the shape of a plow, to open the furrow and press the earth in both directions. I employ a tooth that is curved longitudinally or in a vertical plane, but flat, or nearly so, in a horizontal plane, whereby the point of the tooth projects forward, and its inclined cutting-edges separate freely any roots or other obstructions, and the earth, instead of being thrown to the sides, is carried up the tooth and rolled over and pulverized before it falls at the sides of the furrow formed by the tooth. Thus the earth is more thoroughly prepared than heretofore. I also combine with the cultivator a peculiar plow and hinged mold-board.

In the drawing, Figure 1 is a perspective view of a plow and cultivator, constructed in accordance with and containing my invention and improvements. Fig. 2 is a top view of the same. Fig. 3 is a view of one of the standards which is attached to the frame of the cultivator, and to which standard is attached the tooth of the cultivator. Fig. 4 is a front view of one of the cultivator-teeth. Fig. 5 is a perspective view of one of the standards, with the tooth removed therefrom, and showing the bolt by which the said tooth is attached thereto. Fig. 6 is also a perspective view, showing the center standard and tooth, and also showing the plow, and the manner of attaching and combining the same with the said center standard.

The frame A of my said cultivator and plow I design to make of some hard wood that will answer the required purpose, and of the form and of any size and strength required or deemed best. I I are handles, which are securely fastened to the frame A by means of the screws *a a*, Fig. 2, and the braces *b b*, Fig. 1, and which handles are for the purpose of guiding and working the said plow. The standards E F are designed to be made of malleable iron, but cast-iron or wrought-iron may be used, and are securely fastened to the frame A by means of the screws and nuts *e e*. The projections *f f* on the standards, which are shown at Figs. 3, 5, and 6, catch into recesses on the under side of the frame A, and aid in securely holding and fastening the said standards *e f* to the frame A. The teeth H are preferably of plate-steel. They are curved in the vertical plane, so as to be similar to segments of a cylinder, or nearly so, with the face flat transversely, or slightly rounded. The beveled cutting-edges extend forward, and are nearly in a horizontal plane, so as to separate any roots or similar obstructions. I have shown in Fig. 4 the tooth as widest at the angles Z Z, as the tooth of this shape clears itself most easily when in use, and the two-ended tooth can be reversed when one end is worn. The said teeth, when used in the combination hereinafter claimed, are securely fastened to the standards E F by means of a nut or screw, *g*, Fig. 5. The standard directly under the arms I I, and marked E′, I call the center standard, and to this center standard I hinge the two sections of the mold-board, marked C, which allows the free working of the same, for the purposes hereinafter described. The main parts of the mold-boards B and B′ are fastened to the sections C and C′ by means of nuts and screws, and the upper bolt works in a slot, *h*, in the said mold-board B, whereby the said mold-boards B and B′ may be raised and lowered at pleasure, or as it is desired to regulate the height of the furrow to be cut when the said plow is in operation. The said mold-boards B and B′ are held in any desired position by means of the slotted arms D D, Fig. 1, which are fastened to the frame A by means of the nuts and screws K K. (Shown at Fig. 2.) L L, Fig. 2, are slotted arms running across the top of the frame, and held in position by the thumb-screw *l*, (shown at Figs. 1 and 2,) and which thumb-screw is fastened to the center frame-piece A′. These slotted arms L L and thumb-screw *l* are for the purpose of regulating the distance between the mold-boards B and B′, whereby the width of furrow to be cut is regulated. The said mold-boards B and B′, or sections thereof, C and C′, being hinged to the center standard E′, allow the free working of the said mold-boards B and B′ laterally, while the slots *h h*, Figs. 1 and 6, allow the said mold-boards B and B′ to be elevated or depressed, as required, thereby regulating the height of the furrow to be cut, substantially as hereinbefore described. The frame-pieces A A are hinged or loosely riveted to the center frame-piece A′ at N, Figs. 1 and 2. At M, Figs. 1 and 2, may be fastened any suitable device for the purpose of fastening the horse or horses to said plow and cultivator.

The arms *b b*, nuts and screws *e* N L and K, and slotted arms D D and L L may all be made of cast-iron, and of any size, shape, and strength that will best answer the required purpose.

If desired to use the cultivator and not the plow, the plow may be readily removed by displacing the nut and screw *o*, Figs. 1 and 6, and the nuts and screws K K, Fig. 2, when it will be readily seen the mold-boards may be easily removed; or, if desired to use the plow alone, the teeth and standards may be readily removed, as will be seen by reference to the accompanying drawings.

I am aware that cultivator-teeth have been made with the edges as arcs of circles, and with the face nearly flat. My tooth is made with the edges nearly straight, terminating with a V-shaped point toward the end, and sharpened beneath, so as to cut instead of scrape, and to roll the earth over in front of it, instead of simply pushing it aside.

I claim as my invention—

1. The double mold-board B and C, hinged and connected together, so that the main part of said mold-board B may be elevated or depressed at will, according to the height of furrow desired to be cut, substantially as hereinbefore described and set forth.

2. The sections of the mold-board C and C′, hinged to the center standard E′, whereby a lateral motion may be given to the mold-boards B and B′ to regulate the width of farrow to be cut, substantially in the manner and for the purposes more fully hereinbefore described and set forth.

3. The slotted arms or their equivalents D D, in combination with the mold-boards B and B′, substantially in the manner as and for the purposes herein described and set forth.

4. The cultivator-tooth made with nearly straight edges and V-shaped end, sharpened upon the under side, curved in a vertical plane, and with the face flat, or nearly flat, transversely, substantially as and for the purposes specified.

Signed by me this 19th day of October, 1875.

LEWIS R. WRIGHT.

Witnesses:
W. T. MILLER,
A. E. GIFFORD.